DIGITAL COUNTER

Filed Nov. 22, 1965

A

| UP PULSE NO. | D | C | B | A |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 0 | 0 | 0 | 0 |

B

| UP PULSE NO. | D̄ | C̄ | B̄ | Ā |
|---|---|---|---|---|
| 0 | 1 | 1 | 1 | 1 |
| 1 | 1 | 1 | 1 | 0 |
| 2 | 1 | 1 | 0 | 1 |
| 3 | 1 | 1 | 0 | 0 |
| 4 | 1 | 0 | 1 | 1 |
| 5 | 1 | 0 | 1 | 0 |
| 6 | 1 | 0 | 0 | 1 |
| 7 | 1 | 0 | 0 | 0 |
| 8 | 0 | 1 | 1 | 1 |
| 9 | 0 | 1 | 1 | 0 |
| 0 | 1 | 1 | 1 | 1 |

C

| DOWN PULSE NO. | D | C | B | A |
|---|---|---|---|---|
| 0 | 0 | 0 | 0 | 0 |
| 1 | 1 | 0 | 0 | 1 |
| 2 | 1 | 0 | 0 | 0 |
| 3 | 0 | 1 | 1 | 1 |
| 4 | 0 | 1 | 1 | 0 |
| 5 | 0 | 1 | 0 | 1 |
| 6 | 0 | 1 | 0 | 0 |
| 7 | 0 | 0 | 1 | 1 |
| 8 | 0 | 0 | 1 | 0 |
| 9 | 0 | 0 | 0 | 1 |
| 0 | 0 | 0 | 0 | 0 |

D

| DOWN PULSE NO. | D̄ | C̄ | B̄ | Ā |
|---|---|---|---|---|
| 0 | 1 | 1 | 1 | 1 |
| 1 | 0 | 1 | 1 | 0 |
| 2 | 0 | 1 | 1 | 1 |
| 3 | 1 | 0 | 0 | 0 |
| 4 | 1 | 0 | 0 | 1 |
| 5 | 1 | 0 | 1 | 0 |
| 6 | 1 | 0 | 1 | 1 |
| 7 | 1 | 1 | 0 | 0 |
| 8 | 1 | 1 | 0 | 1 |
| 9 | 1 | 1 | 1 | 0 |
| 0 | 1 | 1 | 1 | 1 |

(Column headings: TERMINALS)

INVENTORS
BERNARD M. GORDON
ROBERT B. CRAVEN
DAVID AHLGREN

Robert J. Schiller
ATTORNEY

United States Patent Office 3,391,342

Patented July 2, 1968

3,391,342
DIGITAL COUNTER

Bernard M. Gordon, Magnolia, Robert B. Craven, Wayland, and David Ahlgren, Newton Corner, Mass., assignors, by mesne assignments, to Janus Control Corporation, Waltham, Mass., a corporation of Massachusetts Filed Nov. 22, 1965, Ser. No. 509,098
9 Claims. (Cl. 328—44)

ABSTRACT OF THE DISCLOSURE

A counter having one or more backward-forward counting stages, each stage having four flip-flops. All of the flip-flops of a stage are simultaneously triggered through gating logic, operating on the trailing edges of input pulses, the carries between stages being also made simultaneously.

This invention relates to digital counters and more particularly to a novel counter particularly adapted for high speed counting in both forward and backward modes.

A large number of digital counters are known and are typified by the counter described in U.S. Patent No. 2,538,122 issued Jan. 16, 1951, to J. T. Potter. Such counters, known as cascaded or ripple counters, comprise a number of bistable devices connected in cascade. In order for the counter to yield an output signal accurately indicative of the numerical value of the input, it must be in a steady state, i.e., it must be in a condition wherein no input pule is propagating along the cascade. From the time at which a pulse is presented to the counter input to the time the counter reaches steady state, there is a delay inherent in a cascaded counter, which delay is substantially the delay of each bistable device times the number of bistable devices. Also, to operate the counter in a backward mode, it is necessary to delay backward counting until no forward counted pulses are being propagated along the cascade. For these reasons cascaded counters capable of counting both forward and backward, (up-down counters) are not reversible at the counting rate, i.e., the repetition rate of an input pulse train.

The present invention has as its principal object a novel counter capable of operation at a counting rate considerably faster than can be achieved with a cascade counter. Further, the present invention contemplates such a high speed counter which is operable in both forward and backward counting modes substantially at the repitition rate of the input pulse trains being counted.

Another object of the present invention is to provide such a reversible counter in which carries between stages (i.e., combinations of bistable devices for counting up to the radix used in the counter) are simultaneous rather than successive.

Still another object of the present invention is to provide a counter stage comprising a plurality of bistable devices the outputs of which are not numerically weighted according to any sequence of such devices but instead are weighted solely by gating means.

Yet another object of the present invention is to provide a gated counter employing "tail end logic" to control the counting stages.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figures 1, 2, 3:
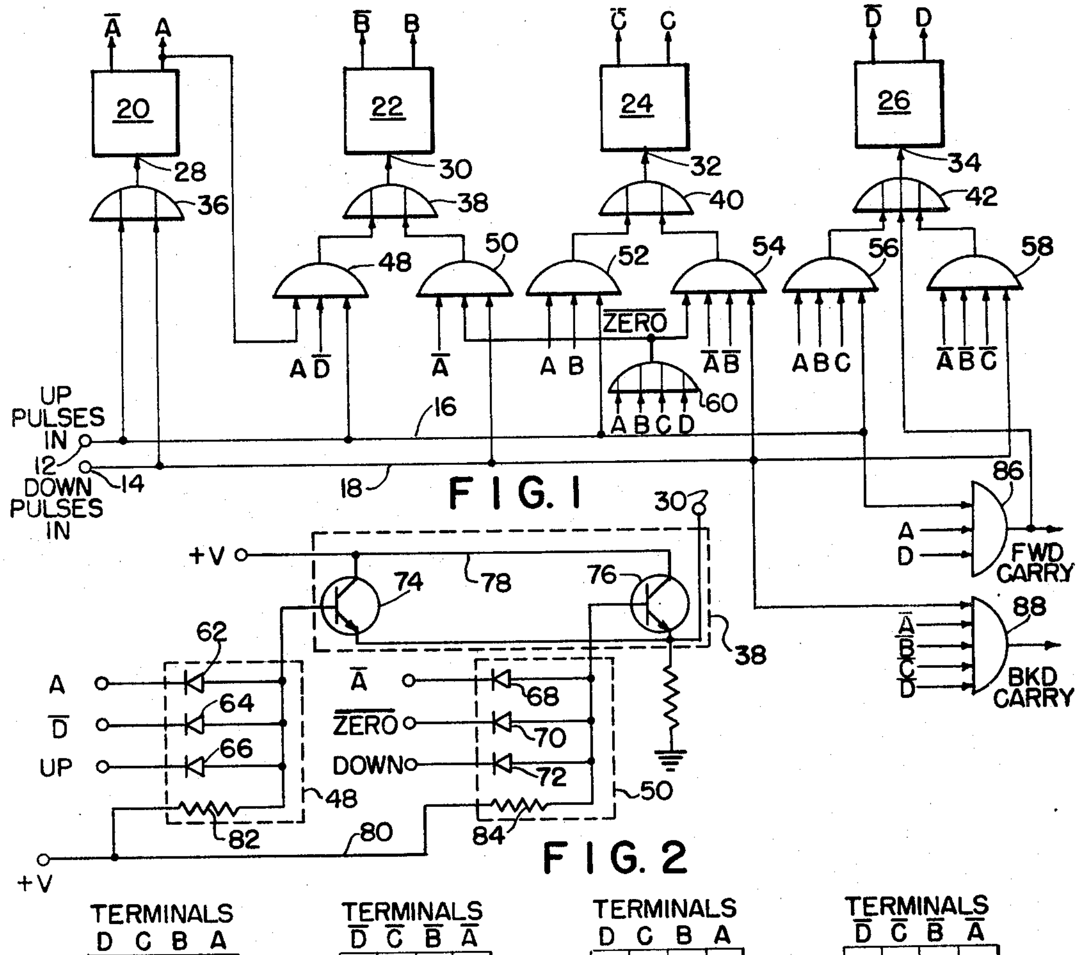
FIG. 1 is a block diagram of one embodiment of the invention.
FIG. 2 is an exemplary circuit diagram of a portion of the embodiment of FIG. 1.
FIG. 3 are tables showing the state of the output terminals of the flip-flops of the embodiment of FIG. 1 for each decimal value of the count in the counter.

The present invention generally comprises one or more counting stages capable of counting a first input pulse train in a forward direction or a second input pulse train in a backward direction, i.e., addition and subtraction. Each stage includes a plurality of bistable devices. Each bistable device is of known type having a pair of output terminals and a common input terminal and is characterized in that the output terminals alternately and exclusively yield one of two signals (i.e., when one output terminal has a logical *zero* thereat, the other provides a logical *one*) upon triggering of the input terminal.

Selected output signals from the bistable devices are employed to control gates coupled to the input terminals for conditioning the gates so that input triggering to selected bistable devices is applied simultaneously.

Referring now to FIG. 1 there is shown a block diagram of a single stage in the form of a decade of a decimal counter, it being apparent that the same principles disclosed can be modified by those skilled in the art to form counters for counting in number systems having bases or radices other than ten. Each stage provides a number in binary type form (such as straight binary code, binary coded decimal, Gray code or the like) and as will appear hereinafter, a number of such stages can be used to provide, after appropriate decoding if desired, a multidigit indication or count of a number of pulses. A pair of counter input terminals 12 and 14 are provided, one of which, for example terminal 12, is intended to have a pulse train applied thereto containing pulses to be counted in a forward or up direction (i.e., added) whilst terminal 14 is intended to have another pulse train applied thereto containing pulses to be counted in a backward or down direction (i.e., subtracted). Connected to terminal 12 is a conductive up-line 16 and terminal 14 has a conductive down-line 18 connected thereto.

As shown, the embodiment of FIG. 1 includes a plurality, e.g., four, known bistable devices or flip-flops 20, 22, 24, and 26. Each of the foregoing is of the type having a complement input terminal (respectively 28, 30, 32, and 34) and a pair of mutually exclusive output terminals (respectively $\overline{A}$, A; $\overline{B}$, B; $\overline{C}$, C; and $\overline{D}$, D). Input terminals 28, 30, 32, and 34 are connected to the respective input terminals of logical OR gates 36, 38, 40, and 42.

Flip-flops 20, 22, 24, and 26 are all of the type known as master-slave flip-flops currently commercially available and manufactured, particularly in integrated circuits, and described in detail in Product Bulletin No. 3, dated July 21, 1964 by Signetics Corporation, Sunnyvale, Calif. Such flip-flops characteristically accept an input pulse at a complement input terminal, but provide no change in output until the input pulse terminates. Thus, for example where the input pulses are a positive pulse the flip-flop outputs occur substantially simultaneously only on the trailing edge or negative-going transition at the end of the pulse. Such flip-flops avoid the use of steering capacitors, difficult to provide in integrated circuits, and which tend to introduce large time delays in operation. Hence, these flip-flops basically are formed of a master flip-flop triggered on the leading edge of a pulse and connected at its input to a simple AND gate at the input of a slave flip-flop. An input of the AND gate is also connected to the input of the master flip-flop such that the slave flip-flop is triggered only when the trailing edge of the input pulse appears.

It will be appreciated that the states of the flip-flops as reflected by the signals appearing at their output terminals can represent a number in one of a number of various binary codes. The signals can be decoded or converted to other number systems by known means such as decoding matrices and displayed or otherwise utilized. Thus, where the device or stage shown in FIG. 1 is intended to provide an output count representing the least significant digits (i.e., $R^1$, where R is the radix of the numerical system) of an input pulse train, OR gate 36 (which feeds the flip-flop selected to provide the least significant binary digit of the stage) has an input terminal connected to down-line 18 as shown. Where the stage is intended to provide an output count representing a more significant digit (i.e., $R^x$, where $X>1$) input terminals 12 and 14 are connected to carry output terminals of gates 86 and 88 respectively of a preceding stage.

Each of the other OR gates have a pair of input terminals connected to output terminals of AND gates. Thus, OR gate 38 is fed from the outputs of AND gates 48 and 50. The input of OR gate 40 is connected to the outputs of AND gates 52 and 54, and OR gate 42 is connected at its input to the outputs of AND gates 56 and 58. One of each of the AND gates connected to each of OR gates 38, 40, and 42 has an input terminal connected directly to up-line 16, the other of each of the AND gates connected to OR gates 38, 40, and 42 having an input terminal connected directly to down-line 18. The other input terminals of all of the AND gates are connected to certain output terminals of the flip-flops according to a logical scheme for conditioning the AND gates to selectively pass the pulses from either line 16 or line 18, as will appear hereinafter.

It will be seen that each OR gate coupled to a flip-flop selected to provide a binary numeral which is not the least significant digit of the binary number expressed by the stage, has a pair of inputs, one coupled to the up-line for forward counting and the other coupled to the down-line for backward counting.

In order to consider the connections used to condition the AND gates properly, a brief description of the operation of the device, counting in a binary-coded decimal mode, will be helpful. Assuming that a sequence of pulses is applied to terminal 12 and that up-line 16 is connected to OR gate 36, it will be apparent that the first pulse will change the state of flip-flop 20. It can further be assumed that a logical *one* is represented by a signal of, for example +4 volts and a logical *zero* is represented by ground level or zero volts and that these signals, as they appear on assertion output terminals, A, B, C, and D of the flip-flops represent the desired count total, (similarly, as these signals appear on negation output terminals $\overline{A}$, $\overline{B}$, $\overline{C}$, and $\overline{D}$, they represent the binary complement of the number at the assertion output terminals). Thus, in the zero state of the counter all of the assertion terminals are at ground or are logical *zeros* as shown in Table A of FIG. 3. The first pulse on line 16 actuates flip-flop 20, reversing the voltage levels on its output terminals so that terminal A now is at the logical *one* level.

It will be seen, referring to Table A, FIG. 3 that each successive pulse at terminal 12 will change the state of the A terminal alternately between logical *zero* and *one* and therefore provides the least significant digit of the binary output of the stage. However, it is desired to condition a forward input connected AND gate so that it can actuate a flip-flop, such as 22, having an output intended to represent the next most significant digit (i.e., $2^2$). For binary-coded decimal counting, the simplest precondition for such flip-flop to provide a logical *one* at its assertion terminal is that output terminal A of flip-flop 20 be at a logical *one* level and that a negation terminal, for example $\overline{D}$, representing the most significant digit be at a logical *one* level, as appears in Table B of FIG. 3. Thus, as shown, terminal A of flip-flop 20 is connected to input terminal A of AND gate 48. It will be understood that in FIG. 1, the output terminals of the various flip-flops are connected to the AND gate input terminals which bear a similar designation, such connections not being shown (except for the example of the connection of output terminal A of flip-flop 20 to input terminal A of gate 48) in order to simplify the drawing. Thus, terminal $\overline{D}$ of flip-flop 26 is connected to input terminal $\overline{D}$ of gate 48.

Similarly, it is desired to condition another AND gate connected to the forward or up-input line 16 so that another flip-flop such as 24 can be actuated to provide an output representing $2^3$. Again examining the tables of FIG. 3, it will be seen that the simplest precondition is that occurring when output terminals A of flip-flop 20 and B of flip-flop 22 are both at the logical *one* level. Hence, the latter two output terminals are connected to correspondingly noted input terminals of gate 52. Lastly, to set up the conditioning of up-input connected AND gate 56 so that flip-flop 26 can be weighted to provide $2^4$, gate 56 has a plurality of input terminals respectively connected to the assertion output terminals A, B, and C of flip-flops 20, 22, and 24.

Conditioning of the AND gates (50, 54, and 58) having inputs connected to down-line 18, provides backward counting. In the backward counting mode, it will be seen from Tables C and D of FIG. 3 that it is desired to change the state of the flip-flops so that, for example, when the first down pulse of line 18 is introduced into the counter (assuming again that the state of the counter flip-flops is such that all assertion terminals are at *zero*) the state of the counter at those assertion terminals will change to binary *nine*. The second pulse on line 18 will change the counter state to binary *eight*, and so forth. To this end, the down-line connected AND gates are conditioned by connections as follows: output terminals $\overline{A}$, $\overline{B}$, and $\overline{C}$ of flip-flops 20, 22, and 24 are connected to corresponding input terminals of gate 58; output terminals $\overline{A}$ and $\overline{B}$ are also connected to input terminals of gate 54; and output terminal $\overline{A}$ is connected to an input terminal of gate 50.

However, these connections are not adequate to properly condition gates 50 and 54. Hence, the invention includes a not-zero, or $\overline{\text{zero}}$, OR gate 60, having its input terminals connected respectively to all the assertion output terminals of the flip-flops, and having its output connected as shown to respective input terminals of gates 50 and 54. Thus, if any assertion terminal is in the logical *one* state, a logical *one* level will appear at the output of gate 60.

FIG. 2 is exemplary of AND and OR gates used to condition the flip-flops and, as shown, AND gate 48 simply comprises three unilateral conductive devices or diodes 62, 64, and 66 having their anodes commonly connected and their cathodes respectively connected to terminals A, $\overline{D}$, and up-line 16. Similarly, AND gate 50 comprises three diodes 68, 70, and 72 having commonly connected anodes and cathodes respectively connected to terminal $\overline{A}$, the output of gate 60 and down-line 18. OR gate 38 comprises a pair of three terminal transistors 74 and 76 preferably connected in emitter-follower configuration. The common anodes of the diodes of gate 48 are connected to the base of transistor 74 and the common anodes of the diodes of gate 50 are connected to the base of transistor 76. The emitters of both transistors are connected to one another and to input terminal 30 of flip-flop 22. Means are included, such as common line 78 connected to the collectors of the transistors for applying a bias potential to the latter. The diode anodes are connected also to the common line 80 for applying bias to the diodes. Gate 48 includes resistor 82 betwen line 80 and the diode anodes to supply current to the base of transistor 74. Similarly gate 50 includes resistor 84 between the diode anodes and line 80.

In describing the operation of the device, it can be assumed that a train of discrete positive pulses to be counted is applied to terminal 12. It should be noted that any pulses on lines 16 and line 18 should be mutually exclusive in time. The first pulse is applied directly through OR gate 36 to flip-flop 20, which because it is a master-slave flip-flop, provides an up or +4 volt level on terminal A only when the trailing edge or negative-going transition of the first pulse occurs. This up level is applied to gate 48. Because at the time the up level occurs at terminal A, terminal $\overline{D}$ is also up (or at logical *one*; cf. Table B of FIG. 3), gate 48 becomes conditioned and the second pulse on line 16 will trigger both flip-flops 20 and 22. Thus, signal terminal A goes to logical *zero* and the state of terminal B goes to logical *one*, again substantially simultaneously with the trailing edge of the triggering pulse. The third input pulse again reverses the state of flip-flop 20 but does not affect any other flip-flop because the input AND gates are not conditioned or enabled. Particularly, gate 48 becomes disabled as terminal A goes to logical *zero*. Referring to FIG. 2 it will be seen that in gate 48 for example, the anodes will not rise to a four volt level (assuming the values of +V and resistor 82 to be appropriate) unless positive four volt signals appear at terminals A, $\overline{D}$, and the up-line at the same time. Thus, although such positive signals may be present at terminals A and $\overline{D}$ simultaneously, thereby conditioning the gate at the end of one input pulse on line 16, the base of transistor 74 is not brought to the four volt level until the next or second pulse appears on line 16. This then serves to raise the potential on the emitter of transistor 74 and thus at terminal 30 of flip-flop 22. The trailing edge of that second pulse however, causes the potential on terminal A to go to ground, effectively disabling gate 48 so that a third pulse cannot affect transistor 74 and thus cannot trigger flip-flop 22.

If it is desired to provide a carry on the tenth pulse the invention includes a forward-carry AND gate 86 having input terminals connected respectively to assertion terminals A and D and to the up-pulse line. The output of gate 86 is connected to terminal 12 of the next stage and will therefore at least trigger the first flip-flop in the next stage. Further, the output terminal of gate 86 is connected to yet another input terminal of gate 42.

Now, for example, just prior to the ninth pulse appearing on line 16, the state of the flip-flops is such that only assertion terminal D is up, all others being at logical *zero*. None of the AND gates are then conditioned. Thus, the ninth pulse will only affect flip-flop 20, and the trailing edge of the pulse will cause a potential rise on assertion terminal A. This serves to complete conditioning of gate 86 and the tenth or zero pulse on line 16 then reverses the state of flip-flop 20 and, being passed by conditioned gate 86, also reverses the state of flip-flop 26, returning all assertion terminals to logical *zero*.

For the sake of illustration, it can be supposed that after the ninth pulse in up-line 16, a series of down pulses (all positive) appear on line 18 and thus are to be counted backward. It will be remembered that the state of the flip-flops is such that only assertion terminals A and D and negation terminals $\overline{B}$ and $\overline{C}$ are a logical *one*, and only gate 86 is enabled. Thus, the only effect of the first down pulse is to change the state of flip-flop 20 so that terminal A goes to logical *zero*. The state of the flip-flops thus changes from 1001 to 1000, (i.e., from binary *nine* to binary *eight*) effectively subtracting the pulse count from the counter total. This change occurs on the trailing edge of the down pulse. Because then negation terminals $\overline{A}$, $\overline{B}$, and $\overline{C}$ are all at logical *one* and gate 58 is enabled, the next successive or second down pulse will be passed by gate 58 changing the state of flip-flop 26. Additionally, the logican *one* level appearing at terminal $\overline{A}$, together with the logical *one* level from OR gate 60 due to the logical *one* state of terminal D, condition gate 50, and the same logical *ones* together with that level at terminal $\overline{B}$ condition gate 54. Thus, that second down pulse also triggers flip-flops 20, 22, and 24 simultaneously. The state of the counter is thus changed from 1000 to 0111, or binary *seven*.

When the counter is a stage representing $R^x$ where X>1, and is at binary *one* state (i.e., only assertion terminal A is at logical *one*,) a pulse on down-line 18 should return the counter to zero and generate a backward carry signal. To this end, the invention includes backward carry AND gate 88 having a plurality of inputs connected respectively to down-line 18 and to all of the negation terminals of the flip-flops. At the binary one state of the counter, none of the down-line controlled AND gates (50, 54, 58, and 88) are enabled, hence the pulse on the down-line merely changes the state of flip-flop 20, bringing assertion terminal A to the logical *zero* level and providing a counter state of binary *zero*. This occurs at the trailing edge of the pulse and at that time, because all negation terminals arrive at the binary *one* level, gates 88 and 58 become enabled. Thus, the next successive down pulse triggers flip-flop 26 and changes the counter state to binary *nine*.

Now, in a second stage representing $R^x$ where X>1, the OR gate feeding the flip-flop weighted to provide the least significant digit has its input terminals connected to lines 16 and 18, which in turn are connected respectively to the outputs of gates 86 and 88 of the next preceding stage heretofore described, i.e., that stage having an output representing $R^{x-1}$. Assuming that such connection exists, as the down pulse triggers flip-flop 26 of the first stage and changes the state of the first stage from binary *zero* to binary *nine* as described, simultaneously the down pulse appears as a carry pulse at the output of gate 88 of the first stage. This triggers flip-flop 20 of the second stage. For example, assuming a two-stage counter wherein the state of the first stage and second stages are respectively binary *zero* (0000) and binary *two* (0010), (i.e., decimal *twenty* for the counter) a backward carry from the first stage changes the state of flip-flop 20 of the second stage to binary *one*. Simultaneously, the down pulse responsible for the backward carry changes flip-flop 22 of the second stage to binary *zero* and the state of the first stage from 0000 to 1001 as heretofore described. Thus, the state of the first and second stages represent respectively binary *nine* and binary *one*, or decimal nineteen.

It will be seen that a particular pulse in a multistage counter of the type described will in some instances be serially propagated as a carry pulse through a number of carry gates. However, these gates have very small delay times compared to bistable devices, such as flip-flops. Because the ultimate triggering provided by such a serially propagated carry pulse can occur within a fraction of the duration of the origional input pulse, the pulse at its destination is considered for purposes of this exposition to be simultaneous with that original pulse.

It will be noted that the arrangement of flip-flops in each stage and the arrangement of stages are not cascaded. Indeed, the weighting, (i.e., the numerical significance) of each flip-flop and stage is dictated only by the nature of the gating employed. Because all flip-flops and stages, if actuated by a pulse, are actuated simultaneously rather than sequentially as in cascaded counters, extremely high counting rates can be achieved. And because the conditioning of gates is achieved in synchronism with the tail-end or tailing edge of a pulse, the gates are preconditioned to be operative upon the leading edge of a next pulse. Thus, there can be no ambiguity in the count made.

Typically, a master-slave flip-flop arrangement exhibits a delay of about 70 nanoseconds from the time the flip-flop is initially triggered to the time the output of the latter reaches a reasonably stable level. The device can thus accept a pulse train in which the minimum pulse repetition period is about 140 nanoseconds, and the device will then count at repetition rates as high as about 7 megacycles.

It will be appreciated that the present invention can also employ well-known flip-flops employing input gating techniques that will insure that the signal transitions at the flip-flop output terminals are simultaneous with the trailing edge of an input pulse.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. A pulse counter stage capable of forward and backward counting, and comprising in combination:
- a plurality of $n$ bistable devices, each having an assertion and a negation output terminal and a complement input terminal, and adapted to provide output signal transitions at said output terminals substantially simultaneously with the trailing edge of an input pulse applied at said input terminal;
- a like plurality of $n$ OR gates each having its output terminal connected to said complement input terminal and having two input terminals;
- a first line for carrying pulses to be counted forwardly;
- a second line for carrying pulses to be counted backwardly;
- one of said OR gates having its input terminals connected directly to respective ones of said lines;
- a plurality of $n-1$ forward AND gates, each having an output terminal connected to an input terminal of a respective one of the others of said OR gates, and an input terminal connected to said first line;
- a plurality of $n-1$ backward AND gates, each having an output terminal connected to the other input terminal of a respective one of the others of said OR gates, and an input terminal connected to said second line;
- means connecting other input terminals of each AND gate to selected ones of said assertion and negation terminals of said bistable devices so that said AND gates are conditioned for controlling application of a given one of said pulses to a corresponding OR gate only upon the signal transitions at said assertion or negation terminals concurrently with the trailing edge of a preceding one of said pulses.

2. A pulse counter stage as defined in claim 1 wherein said means connecting other input terminals of each AND gate includes an OR gate having its input terminals connected to all of said assertion terminals.

3. A pulse counter stage as defined in claim 1 including means for propagating forward and backward carry pulses.

4. A pulse counter stage as defined in claim 3 wherein said means for propagating includes an AND gate having its input terminals connected to said first line and to bistable devices' output terminals exhibiting simultaneous output transitions of a first polarity only concurrent with the trailing edge of the pulse corresponding to the R—1 state of the counter stage where R is the radix of the numerical system in which said counter stage is intended to count as expressed in binary code according to the output of said stage, and another AND gate having its input terminals connected to said second line and to bistable devices' output terminals having simultaneous output transitions of said first polarity only concurrently with the trailing edge of the pulse corresponding to the R+1 state of the counter stage.

5. A pulse counter stage as defined in claim 1 wherein each bistable device is a flip-flop;
- and said means connecting input terminals of said AND gates to output terminals of said flip-flops are arranged for providing assertion terminal output signals of said flip-flops weighted to represent respective digits corresponding to diffeernt binary values according to a predetermined binary code.

6. A pulse counter stage as defined in claim 5 wherein said binary code is 8–4–2–1.

7. A pulse counter stage capable of forward and backward counting, and comprising in combination;
- first, second, third and fourth flip-flops, each having an assertion output terminal, a negation output terminal and a complement input terminal, and adapted to provide output signal transitions at said output terminals substantially simultaneously with the trailing edge of an input pulse applied at said input terminal;
- first, second, third, and fourth OR gates each having an output terminal connected to said complement input terminal of the corresponding first, second, third and fourth of said flip-flops, and having at least two input terminals;
- a first line for carrying pulses to be counted forwardly;
- a second line for carrying pulses to be counted backwardly;
- said first OR gate having its input terminals connected directly to respective ones of said lines;
- first, second, and third forward AND gates, each having an output terminal connected to a corresponding one input terminal of said second, third and fourth OR gates and an input terminal connected to said first line;
- first, second, and third backward AND gates, each having an output terminal connected to a corresponding other input terminal of said second, third, and fourth OR gates and an input terminal connected to said second line;
- means connecting the assertion output terminal of said first flip-flop to respective input terminals of said first, second, and third forward AND gates;
- means connecting the assertion output terminal of said second flip-flop to respective input terminals of said second and third forward AND gates;
- means connecting the assertion output terminal of said third flip-flop to an input terminal of said third forward AND gate;
- means connecting the negation output terminal of said first flip-flop to respective input terminals of said first, second, and third backward AND gates;
- means connecting the negation output terminal of said second flip-flop to respective input terminals of said second and third backward AND gates;
- means connecting the negation output terminal of said third flip-flop to an input terminal of said third backward AND gate;
- means connecting the negation terminal of said fourth flip-flop to an input terminal of said first forward AND gate; and
- a fifth OR gate connecting all flip-flops assertion terminals together to a terminal connected to respective one input terminals of each of said first and second backward AND gates.

8. A pulse counter as defined in claim 7 including means for propagating forward and backward carry pulses from said stage and comprising first and second carry AND gates;

means connecting respective input terminals of said first carry gate to said first line and to the assertion output terminals of said first and fourth flip-flops; and means connecting respective input terminals of said second carry gate to said second line and to each negation output terminal of each of said flip-flops.

9. A pulse counter as defined in claim 8 including means connecting the output terminal of said first carry gate to a third input terminal of said fourth OR gate.

References Cited

UNITED STATES PATENTS

| | | | |
|---|---|---|---|
| 2,970,759 | 2/1961 | Lanning | 328—44 X |
| 3,277,380 | 11/1966 | Paufve | 307—88.5 X |

ARTHUR GAUSS, *Primary Examiner.*

JOHN ZAZWORSKY, *Examiner.*